US008704848B2

(12) United States Patent  (10) Patent No.: US 8,704,848 B2
Liu et al.  (45) Date of Patent: Apr. 22, 2014

(54) CALIBRATION SYSTEM AND METHOD THEREOF FOR CALIBRATING DISPLAY

(75) Inventors: Chao-Wen Liu, Miao-Li County (TW); Hung-Wei Chih, Miao-Li County (TW)

(73) Assignee: Young Lighting Technology Inc., Hsin-Chu (TW)

( * ) Notice: Subject to any disclaimer, the term of this patent is extended or adjusted under 35 U.S.C. 154(b) by 1184 days.

(21) Appl. No.: 12/482,438

(22) Filed: Jun. 10, 2009

(65) Prior Publication Data

US 2010/0265266 A1 Oct. 21, 2010

Related U.S. Application Data

(60) Provisional application No. 61/171,448, filed on Apr. 21, 2009.

(51) Int. Cl.
G09G 5/02 (2006.01)

(52) U.S. Cl.
USPC ........... 345/596; 345/589; 345/597; 345/600; 345/602

(58) Field of Classification Search
CPC ............... G09G 5/02; G09G 2340/06; G09G 2320/0693; G09G 2320/0673; G06T 11/001; H04N 1/4078
See application file for complete search history.

(56) References Cited

U.S. PATENT DOCUMENTS

| 7,079,155 B2 | 7/2006 | Kanai |
| 7,375,854 B2 | 5/2008 | Hsu et al. |
| 2002/0126106 A1 | 9/2002 | Naito |
| 2005/0128497 A1 | 6/2005 | Hirashima et al. |
| 2008/0309766 A1 | 12/2008 | Lin |

FOREIGN PATENT DOCUMENTS

| JP | 2002-182633 | 6/2002 |
| JP | 2002-247401 | 8/2002 |
| JP | 2003-248467 | 9/2003 |
| JP | 2003-271121 | 9/2003 |
| JP | 2003-271122 | 9/2003 |
| JP | 2005-196156 | 7/2005 |
| JP | 2005-328386 | 11/2005 |
| JP | 2006-113151 | 4/2006 |
| JP | 2008-056669 | 3/2008 |
| JP | 4109702 | 7/2008 |
| TW | 200306123 | 11/2003 |
| TW | I283852 | 7/2007 |
| WO | 9923637 | 5/1999 |

OTHER PUBLICATIONS

"Office Action of Japan counterpart application" issued on Apr. 17, 2012, p. 1-p. 4, in which the listed references were cited.
Authored by Wang, Yi-Ping, article titled as "Color transformation and gray balance of liquid crystal display", the master thesis of Department of graphic communications and technology, urn: etd-1227104-121001 Jul. 28, 2004.
"Search Report of European Counterpart Application", issued on Oct. 4, 2012, p. 1-p. 10.

*Primary Examiner* — Antonio A Caschera
(74) *Attorney, Agent, or Firm* — Jianq Chyun IP Office

(57) ABSTRACT

A transform model is established by the calibration system for color transformation between a first color space and a second color space. Three first target curves are defined and transformed by the transform model so as to establish three look-up tables. The display is calibrated according to the three look-up tables such that the color temperature of the display may be substantially constant for every gray-level.

15 Claims, 14 Drawing Sheets

| Look-up table | | Second native display curve | | Final target curve | |
|---|---|---|---|---|---|
| Input | Calibrated | Calibrated | Displayed | Input | Displayed |
| 255 | 255 | 255 | 255 | 255 | 255 |
| 254 | 253.5 | 254 | 254 | 254 | 253 |
| 253 | 252.5 | 253 | 252 | 253 | 251 |
| ⋮ | ⋮ | 252 | 250 | ⋮ | ⋮ |
| | | ⋮ | ⋮ | 131 | 103 |
| (130) | (128) | | | (130) | (102) |
| ⋮ | ⋮ | (128) | (102) | 129 | 100 |
| | | 127 | 97 | 128 | 98 |
| | | ⋮ | ⋮ | 127 | 97 |
| 2 | 2 | 2 | 2 | 2 | 2 |
| 1 | 1 | 1 | 1 | 1 | 1 |
| 0 | 0 | 0 | 0 | 0 | 0 |

FIG. 11

CALIBRATION SYSTEM AND METHOD THEREOF FOR CALIBRATING DISPLAY

CROSS-REFERENCE TO RELATED APPLICATION

This application claims the priority benefit of U.S.A. provisional application Ser. No. 61/171,448, filed on Apr. 21, 2009. The entirety of the above-mentioned patent application is hereby incorporated by reference herein and made a part of this specification.

BACKGROUND OF THE INVENTION

1. Field of Invention

The present invention is related to a calibration system and a method thereof for calibrating a display, and more specifically, to a calibration system and a method thereof for color calibration of a display.

2. Description of Related Art

In the recent years, the display technology has significantly developed. A significant portion of the traditional cathode ray tube (CRT) displays has been replaced by the panel displays. One of the most common panel displays is the thin-film transistor liquid crystal display (TFT-LCD). In addition, the plasma display and the organic light emitting diode (OLED) display become more and more common. The display part of the panel display includes the pixel array. The pixel array is an ordinary matrix array, and the pixel array is driven by a driver. The driver drives the corresponding pixels based on the arrayed image data. The pixels display the specific colors at the specific time under control by the driver. However, the color of the pixel is still required to be calibrated (such as gamma curve correction) in order to match the ideal color for the human eyes.

Please refer to FIG. 1, and FIG. 1 is a diagram showing the relationships between the gray level and two chromaticity values x and y of the CIE xyY color space of a conventional display panel. The vertical axis represents the two chromaticity values x and y, and the horizontal axis represents the gray level. In addition, the curve 260 responds to the chromaticity value x, and the curve 262 responds to the chromaticity value y. The two chromaticity values x and y are measured when the display panel displays patterns. Each of the patterns corresponds to a gray level, and the gray level is regarded as the graduation of the horizontal axis of FIG. 1. Each of the patterns may be a black pattern, a gray pattern, or a white pattern. For instance, the pattern corresponded to the gray level of 0 is a black pattern, the pattern corresponded to the gray level of 255 is a white pattern, and the pattern corresponded to the gray level of 1 to 254 is a gray pattern. In an ideal case, the two measured chromaticity values x and y may be constant. Otherwise, the color temperature corresponded to the gray levels is various. In other words, if the measured chromaticity values x and y are not constant, the color temperature of each of the gray levels is not fixed, such that display panel does not displays the color uniformly.

The Taiwan Patent No. 200306123, corresponding to the U.S. Pat. No. 7,079,155, provides an image display device, an image processing method, and a computer-readable medium adapted to perform proper color reproduction while saving memory capacity. The image display device uses a first color corrector to refer to a three-dimensional color correction table, matching a color characteristic of the image display device with a reference color characteristic based on a characteristic value of the image display device, and to apply desired color correction to the inputted image data. Then, the image display device uses second color corrector to refer to a one-dimensional color correction table for correcting gradation according to an application circumstances, and applies desired color correction to the inputted image data.

Another Taiwan Patent No. I283852, corresponding to the U.S. Pat. No. 7,375,854, discloses a method for color correction. A plurality of groups of gray levels and luminance of a light source of a display device are respectively selected by a color measurement system. The selected data of each color light are respectively calculated to obtain fitting functions, and the fitting functions may fit the gray level data of each interval. The fitting luminance of the gray levels in interval is obtained by the fitting functions and formed into a look-up table. Then in order to correspond a gamma curve of normalized gray data of image to a predetermined target curve, the two gamma curves are first taken to logarithmic calculation and the modified gray signals are obtained from the look-up table, then the modified gray signals are transmitted out for providing the display device to express the gray distribution state.

SUMMARY OF THE INVENTION

The present invention is to provide a method of calibrating a display, such that the color temperature of the display may be substantially constant for every gray-level.

The present invention is to provide a calibration system for color calibration of a display, such that the color temperature of the display may be substantially constant for every gray-level.

An embodiment of the present invention provides a method of calibrating a display. The method includes steps of: measuring the display to generate three first measured data sets by utilizing a measurement unit while the display displays three primary-color patterns according to three primary-color-image data sets; measuring the display to generate a second measured data set by utilizing the measurement unit while the display displays a black pattern according to a black-image data set; establishing a transform model according to the three first measured data sets, the second measured data set, the three primary-color-image data sets, and the black-image data set by utilizing a processing unit; measuring the display to generate a plurality of third measured data sets by utilizing the measurement unit while the display displays a plurality of gray-level patterns according to a plurality of gray-image data sets; establishing three first native display curves according to the second measured data set and the third measured data sets by utilizing the processing unit; transforming the three first native display curves into three second native display curves by utilizing the transform model; defining three final target curves by utilizing the processing unit; establishing three look-up tables according to the three final target curves and the three second native display curves by utilizing the processing unit; providing an input image data set to the processing unit; converting the input image data set to a calibrated image data set according to the three look-up tables; and displaying a calibrated image on the display according to the calibrated image data set.

An embodiment of the present invention provides calibration system for calibrating a display. The calibration system includes a measurement unit and a processing unit. The measurement unit is configured to measure the display so as to generate measured data sets while the display displays patterns according to image data sets. The processing unit is coupled to the measurement unit and configured to establish a transform model and three look-up tables. The processing unit establishes the transform model according to three first measured data sets, a second measured data set, three primary-color-image data sets, and a black-image data set. The measurement unit generates the three first measured data sets by measuring the display while the display displays three primary-color patterns according to the three primary-color-image data sets. The measurement unit generates the second measured data set by measuring the display while the display displays a black pattern according to the black-image data set. The processing unit uses the transform model to transform three first native display curves into three second native display curves. The processing unit establishes the three first native display curves according to the second measured data set and a plurality of third measured data sets, and the measurement unit generates the third measured data sets by measuring the display while the display displays a plurality of gray-level patterns according to a plurality of gray-image data sets. The processing unit defines three final target curves and establishes the three look-up tables according to the three final target curves and the three second native display curves. The processing unit converts an input image data set to a calibrated image data set according to the three look-up tables, and the processing unit outputs the calibrated image data set to the display, such that the display displays a calibrated image according to the calibrated image data set.

In an embodiment of the present invention, the processing unit includes a signal generator coupled to the display and configured to output image data sets to the display.

In an embodiment of the present invention, the three primary-color-image data sets are a red-image data set, a green-image data set, and a blue-image data set, and the three primary-color patterns are a red pattern, a green pattern, and a blue pattern. The display displays the red pattern according to the red-image data set, the display displays the green pattern according to the green-image data set, and the display displays the blue pattern according to the blue-image data set.

In an embodiment of the present invention, each of the gray-image data sets has a first color subset, a second color subset, and a third color subset. Three pixel values of the first color subset, the second color subset, and the third color subset are identical.

In an embodiment of the present invention, the processing unit obtains the three final target curves by normalizing three second target curves, and the processing unit uses the transform model to transform three first target curves into the three second target curves.

In an embodiment of the present invention, the processing unit normalizes the three second target curves by scaling the three second target curves by a ratio of a standard level to a maximum of three maximum levels of the three second target curves.

In an embodiment of the present invention, the processing unit defines two of the three first target curves according to the rest one of the three first target curves and three chromaticity values x, y, and z of the CIE xyY color space.

In an embodiment of the present invention, the processing unit defines the rest one of the three first target curves by scaling a gamma curve by a maximum level of a corresponding one of the three first native display curves.

In an embodiment of the present invention, the rest one of the three first native display curves is a curve of tristimulus value Y of the CIE 1931 XYZ color space.

In an embodiment of the present invention, the processing unit calculates a compensation ratio according to the transform model and three maximum levels of the three final target curves, and the processing unit increases a power of a light source of the display according the compensation ratio.

In the embodiments of the present invention, a transform model is established for color transformation between a first color space and a second color space. Three first target curves are defined and transformed by the transform model so as to establish three look-up tables. The display is calibrated according to the look-up tables such that the color temperature of the display may be substantially constant for every gray-level.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 11 shows a way to establish one of the three look-up tables according to an embodiment of the present invention.

DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
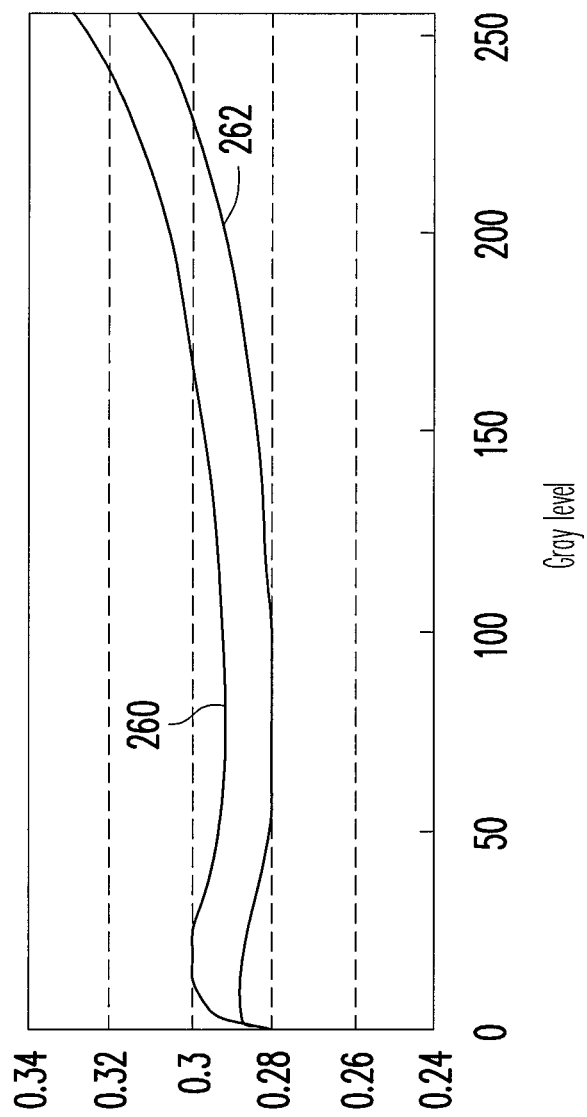
FIG. 1 is a diagram showing the relationships between the gray level and two chromaticity values x and y of the CIE xyY color space of a conventional display panel.
Figure 2:
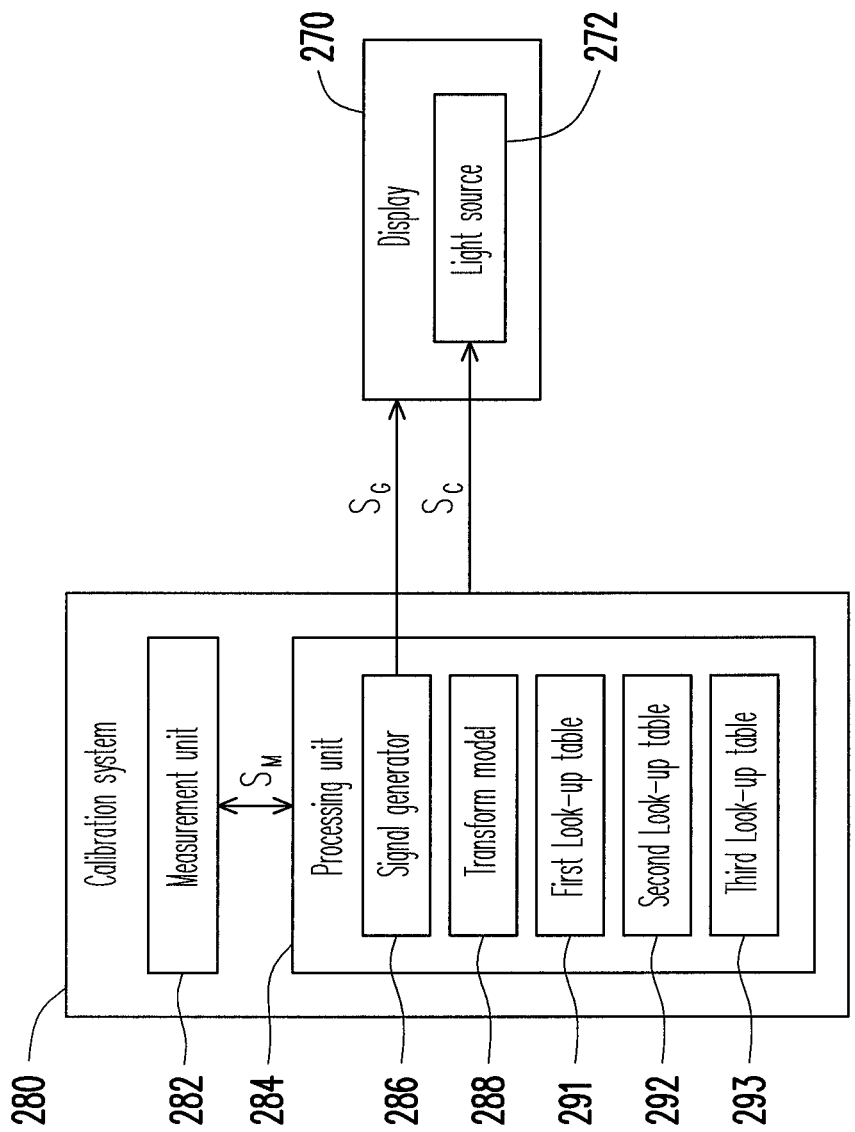
FIG. 2 is a functional block diagram of a display and a calibration system according to an embodiment of the present invention.

Please refer to FIG. 2, and FIG. 2 is a functional block diagram of a display 270 and a calibration system 280 according to an embodiment of the present invention. The calibration system 280 is used for color calibration of the display 270. The display 270 may be, for example, a thin film transistor-liquid crystal display (TFT-LCD), an organic light emitting diode (OLED) display, a plasma display, a cathode ray tube (CRT) display, or the like. The calibration system 280 has a measurement unit 282 and a processing unit 284. In the embodiment, the measurement unit 282 is a photo-sensing device for sensing the color-density of the display 270. For example, the measurement unit 282 may be a CA-210 display color analyzer produced by KONICA MINOLTAR, Inc. However, the present invention is not limited thereto. In addition, the processing unit 284 may be a computer, a personal digital assistant (PDA), a set to box (STB), or the like. The processing unit 284 is coupled to the measurement unit 282 and the display 270, and the processing unit 284 includes a signal generator 286. The signal generator 286 is coupled to the display 270 and configured to output image data sets $S_G$ to the display 270, such that the display 270 displays corresponding patterns based on the received output image data sets $S_G$. In the embodiment, the signal generator 286 is a graphic adapter. However, the present invention is not limited thereto. The measurement unit 282 is configured to measure the display 270 so as to generate measured data sets $S_M$ while the display 270 displays patterns according to the image data sets $S_G$. In the embodiment, the image data sets $S_G$ are image data of the RGB color system and may be represented as $$\begin{bmatrix} R \\ G \\ B \end{bmatrix}.$$

The parameters R, G, and B represent the pixel values of the image data sets $S_G$ for red, green, and blue respectively. In addition, the measured data sets $S_M$ are data of the CIE 1931 XYZ color space and may be represented as $$\begin{bmatrix} X \\ Y \\ Z \end{bmatrix}.$$

The parameters X, Y, and Z represent the tristimulus values X, Y, and Z of the measured data sets $S_M$ respectively. The CIE 1931 XYZ color space is created by the International Commission on Illumination (CIE) in 1931.

Figure 3:
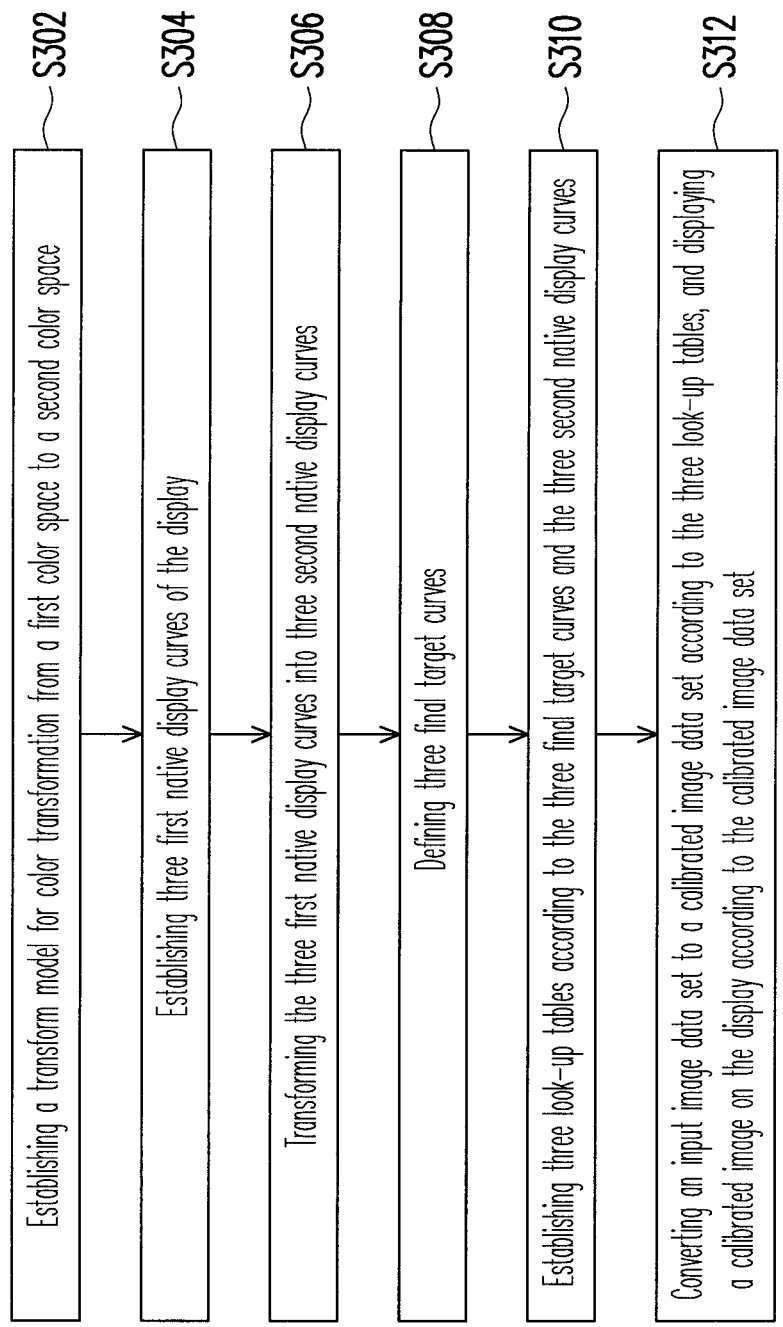
FIG. 3 is a flow chart of the method of calibrating the display according to an embodiment of the present invention.

Please refer to FIG. 3, and FIG. 3 is a flow chart of the method of calibrating the display 270 according to an embodiment of the present invention. In Step S302, the processing unit 284 establishes a transform model 288 for color transformation from a first color space to a second color space. In the embodiment, the first color space is the RGB color space, and the RGB color space is defined by the three chromaticities of the red, green, and blue additive primaries. The second color space is the CIE 1931 XYZ color space. However, the present invention is not limited thereto. For example, the first color space and the second color space are two different color spaces selected from a group consisting of the RGB color space, Adobe RGB color space, sRGB color space, CIE 1931 XYZ color space, CIE xyY color space, CIE 1960 color space, CIE 1964 color space, and CIE 1976 color space. An exemplary transform model, established by the processing unit 284, for color transformation between the RGB color space and the CIE 1931 XYZ color space is mathematically represented as follows:

$$\begin{bmatrix} R \\ G \\ B \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} X \\ Y \\ Z \end{bmatrix} + \begin{bmatrix} O_R \\ O_G \\ O_B \end{bmatrix} \quad (1)$$

where the parameters $O_R$, $O_G$, and $O_B$ represent the offsets of the pixel values of the image data sets $S_G$ for red, green, and blue respectively; and the parameters $C_{11}$-$C_{13}$, $C_{21}$-$C_{23}$, and $C_{31}$-$C_{33}$ are coefficients of a transformation matrix $$\begin{bmatrix} C_{11} & C_{12} & C_{13} \\ C_{21} & C_{22} & C_{23} \\ C_{31} & C_{32} & C_{33} \end{bmatrix}$$

of the transform model.

Figure 4:
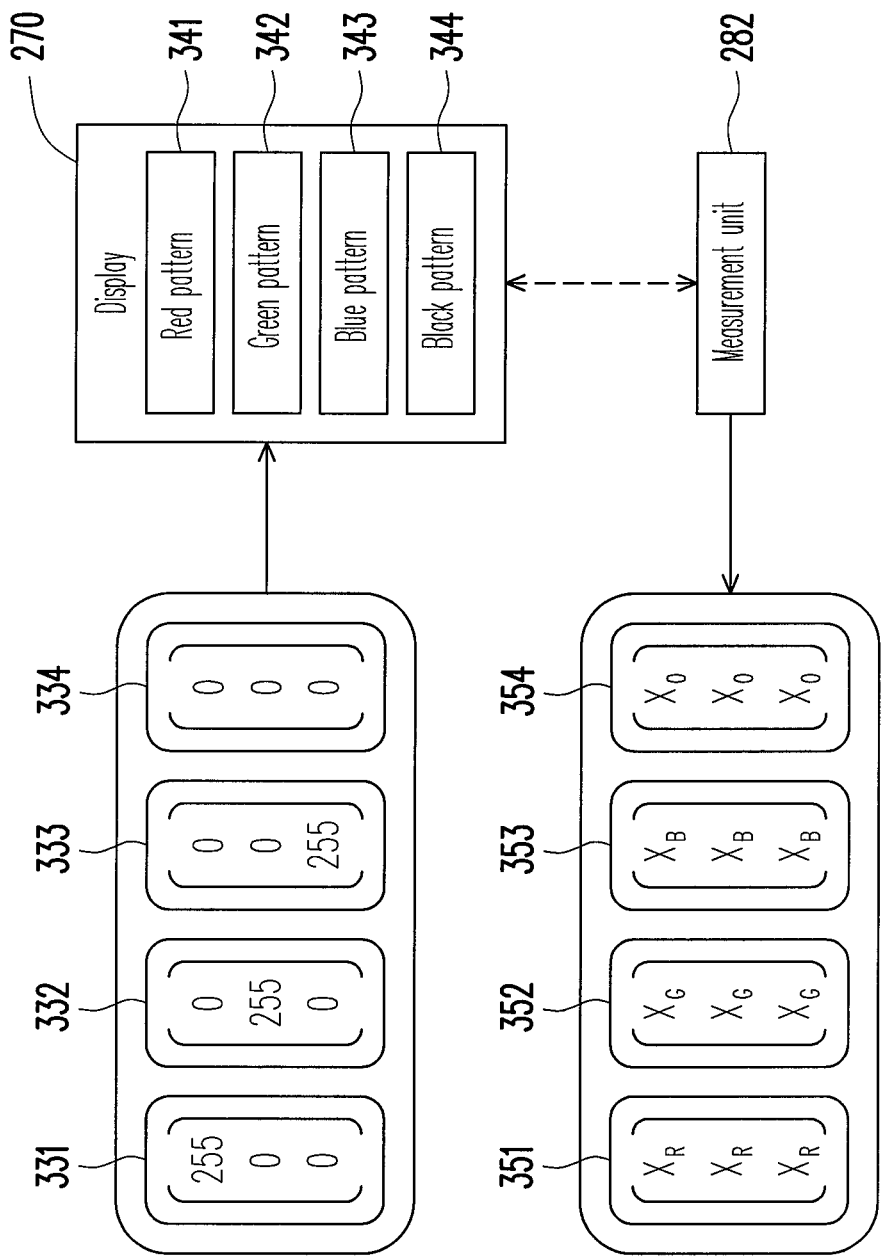
FIG. 4 shows how to generate the measured data sets 351-354 by measuring the test patterns 341-344 displayed on the display according to an embodiment of the present invention.

Referring to FIGS. 4 and 2, before establishing the transform model 288, the signal generator 286 transmits three primary-color-image data sets 331-333 to the display 270, such that the display 270 displays three primary-color patterns 341-343 according to the received primary-color-image data sets 331-333. The three primary-color-image data sets 331-333 are a red-image data set 331, a green-image data set 332, and a blue-image data set 333. The three primary-color patterns 341-343 are a red pattern 341, a green pattern 342, and a blue pattern 343. The display 270 displays the red pattern 341 according to the red-image data set 331, displays the green pattern 342 according to the green-image data set 332, and displays the blue pattern 343 according to the blue-image data set 333. In the embodiment, the three primary-color-image data sets 331-333 are image data of the RGB color system and are respectively represented as $$\begin{bmatrix} 255 \\ 0 \\ 0 \end{bmatrix}, \begin{bmatrix} 0 \\ 255 \\ 0 \end{bmatrix}, \text{ and } \begin{bmatrix} 0 \\ 0 \\ 255 \end{bmatrix}.$$

The three primary-color patterns 341-343 may be simultaneously or sequentially displayed on the display 270. When the display 270 displays the three primary-color patterns 341-343, the measurement unit 282 is used to measure the display 270 so as to generate three first measured data sets 351-353. In the embodiment, the three first measured data sets 351-353 are respectively represented as $$\begin{bmatrix} X_R \\ Y_R \\ Z_R \end{bmatrix}, \begin{bmatrix} X_G \\ Y_G \\ Z_G \end{bmatrix}, \text{ and } \begin{bmatrix} X_B \\ Y_B \\ Z_B \end{bmatrix}.$$

In detail, the measurement unit 282 generates the measured data set $$\begin{bmatrix} X_R \\ Y_R \\ Z_R \end{bmatrix}$$

while the display 270 displays the red pattern 341, the measurement unit 282 generates the measured data set $$\begin{bmatrix} X_G \\ Y_G \\ Z_G \end{bmatrix}$$

while the display 270 displays the green pattern 342, and the measurement unit 282 generates the measured data set $$\begin{bmatrix} X_B \\ Y_B \\ Z_B \end{bmatrix}$$

while the display 270 displays the blue pattern 343. According to the equation (1), the relationships between the three primary-color-image data sets 331-333 and the three first measured data sets 351-353 are described as follows:

$$\begin{bmatrix} 255 \\ 0 \\ 0 \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} X_R \\ Y_R \\ Z_R \end{bmatrix} + \begin{bmatrix} O_R \\ O_G \\ O_B \end{bmatrix} \quad (2)$$

$$\begin{bmatrix} 0 \\ 255 \\ 0 \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} X_G \\ Y_G \\ Z_G \end{bmatrix} + \begin{bmatrix} O_R \\ O_G \\ O_B \end{bmatrix} \quad (3)$$

$$\begin{bmatrix} 0 \\ 0 \\ 255 \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} X_B \\ Y_B \\ Z_B \end{bmatrix} + \begin{bmatrix} O_R \\ O_G \\ O_B \end{bmatrix} \quad (4)$$

Moreover, a black-image data set 334 is transmitted to the display 270, such that the display 270 displays a black pattern 344 according to the black-image data set 334. In the embodiment, the black-image data set 334 is represented as $$\begin{bmatrix} 0 \\ 0 \\ 0 \end{bmatrix}.$$

When the display 270 displays the black pattern 344, the measurement unit 282 measures the display 270 so as to generate a second measured data set 354. In the embodiment, the second measured data set 354 is represented as $$\begin{bmatrix} X_0 \\ Y_0 \\ Z_0 \end{bmatrix}.$$

According to the equation (1), the relationship between the black-image data set 334 and the second measured data set 354 are described as follows:

$$\begin{bmatrix} 0 \\ 0 \\ 0 \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} X_0 \\ Y_0 \\ Z_0 \end{bmatrix} + \begin{bmatrix} O_R \\ O_G \\ O_B \end{bmatrix} \quad (5)$$

Since each parameter of the measured data sets $$\begin{bmatrix} X_R \\ Y_R \\ Z_R \end{bmatrix}, \begin{bmatrix} X_G \\ Y_G \\ Z_G \end{bmatrix}, \begin{bmatrix} X_B \\ Y_B \\ Z_B \end{bmatrix},$$

and $$\begin{bmatrix} X_0 \\ Y_0 \\ Z_0 \end{bmatrix}$$

is known, the processing unit 284 may calculate the values of the parameters $C_{11}$-$C_{13}$, $C_{21}$-$C_{23}$, $C_{31}$-$C_{33}$, $O_R$, $O_G$, and $O_B$ according to the equations (2)-(5). Therefore, the processing unit 284 establishes the transform model 288 according to the three first measured data sets 351-354, the second measured data set 354, the three primary-color-image data sets 331-333, and the black-image data set 334. An exemplary transform model 288 is represented as follows:

$$\begin{bmatrix} R \\ G \\ B \end{bmatrix} = \begin{bmatrix} 0.016772 & -0.00785 & -0.00238 \\ -0.00598 & 0.011275 & 0.000035 \\ 0.000530 & -0.00138 & 0.006025 \end{bmatrix} \begin{bmatrix} X \\ Y \\ Z \end{bmatrix} + \begin{bmatrix} -0.00054 \\ -0.00053 \\ -0.00083 \end{bmatrix} \quad (6)$$

Figure 5:
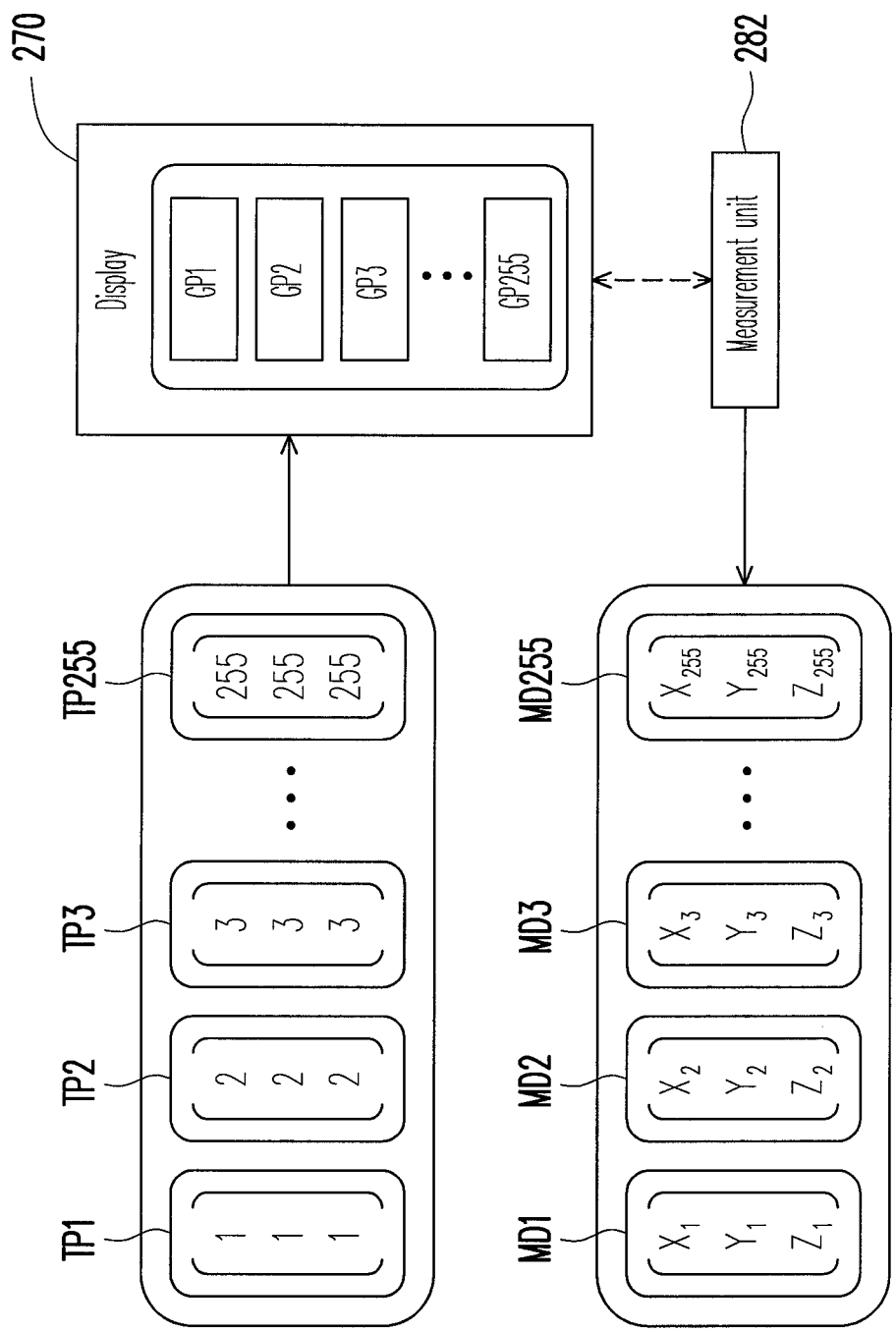
FIG. 5 shows how to generate the measured data sets MD1-MD255 by measuring the test patterns GP1-GP255 displayed on the display according to an embodiment of the present invention.

Please refer FIG. 3 again. After the transform model 288 is established, the processing unit 284 establishes three first native display curves of the display 270 in step S304. Before establishing the three first native display curves of the display 270, the signal generator 286 of the processing unit 284 transmits a plurality of gray-image data sets to the display 270. Please refer to FIGS. 2 and 5. The signal generator 286 transmits a plurality of gray-image data sets TP1-TP255 to the display 270, such that the display 270 displays a plurality of gray-level patterns GP1-GP255 according to a plurality of gray-image data sets TP1-TP255. In the embodiment, the gray-image data sets TP1-TP255 are image data of the RGB color system and are respectively represented as $$\begin{bmatrix} 1 \\ 1 \\ 1 \end{bmatrix}, \begin{bmatrix} 2 \\ 2 \\ 2 \end{bmatrix}, \begin{bmatrix} 3 \\ 3 \\ 3 \end{bmatrix}, \ldots, \text{ and } \begin{bmatrix} 255 \\ 255 \\ 255 \end{bmatrix}.$$

In detail, the parameters R, G, and B of the matrix $$\begin{bmatrix} R \\ G \\ B \end{bmatrix}$$

represent three pixel values of a first color subset, a second color subset, and a third color subset of the image data sets $S_G$ respectively. The symbol R of the matrix $$\begin{bmatrix} R \\ G \\ B \end{bmatrix}$$

represents the pixel value of the first color subset for red, the symbol G of the matrix $$\begin{bmatrix} R \\ G \\ B \end{bmatrix}$$

represents the pixel value of the first color subset for green, and the symbol R of the matrix $$\begin{bmatrix} R \\ G \\ B \end{bmatrix}$$

represents the pixel value of the first color subset for blue. Moreover, the three pixel values of the first color subset, the second color subset, and the third color subset of the same one of the gray-image data sets TP1-TP255 are identical. For example, the three pixel values of the $1^{st}$ gray-image data set TP1 are all 1, the three pixel values of the $2^{nd}$ gray-image data set TP2 are all 2, the three pixel values of the $3^{rd}$ gray-image data set TP3 are all 3, and so on. In addition, the display 270 displays the gray-level pattern GP1 according to the $1^{st}$ gray-image data set TP1, displays the gray-level pattern GP2 according to the $2^{nd}$ gray-image data set TP2, displays the gray-level pattern GP3 according to the $3^{rd}$ gray-image data set TP3, and so on. The gray-image data sets TP1-TP255 may be simultaneously or sequentially displayed on the display 270. When the display 270 displays the gray-level patterns GP1-GP255, the measurement unit 282 measures the display 270 so as to generate a plurality of third measured data sets MD1-MD255. The measurement unit 282 generates the measured data set MD1 by measuring the display 270 while the display 270 displays the gray-level pattern GP1, and the measurement unit 282 generates the measured data set MD2 by measuring the display 270 while the display 270 displays the gray-level pattern GP2, and so on. In the embodiment, the third measured data sets MD1-MD255 are data of the CIE 1931 XYZ color space and are respectively represented as $$\begin{bmatrix} X_1 \\ Y_1 \\ Z_1 \end{bmatrix}, \begin{bmatrix} X_2 \\ Y_2 \\ Z_2 \end{bmatrix}, \begin{bmatrix} X_3 \\ Y_3 \\ Z_3 \end{bmatrix}, \ldots, \text{and} \begin{bmatrix} X_{255} \\ Y_{255} \\ Z_{255} \end{bmatrix}.$$

In the step S304, the processing unit 284 establishes the three first native display curves of the display 270 according to the second measured data set $$\begin{bmatrix} X_0 \\ Y_0 \\ Z_0 \end{bmatrix}$$

and the third measured data sets $$\begin{bmatrix} X_1 \\ Y_1 \\ Z_1 \end{bmatrix} \text{ to } \begin{bmatrix} X_{255} \\ Y_{255} \\ Z_{255} \end{bmatrix}.$$

Figure 6A:
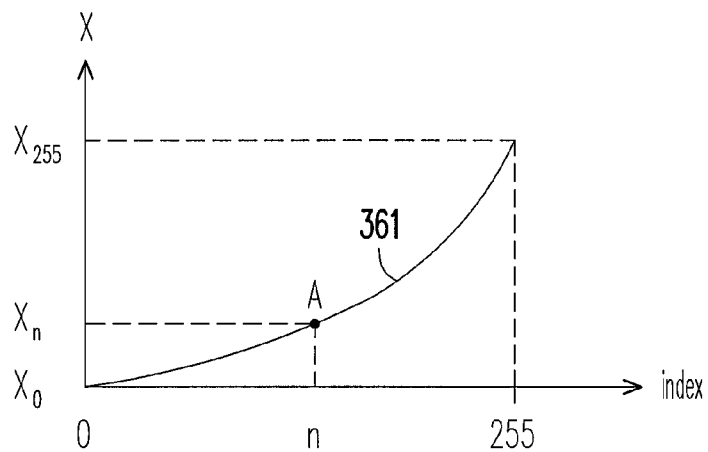
FIGS. 6A-6C are diagrams illustrating three first native display curves according to an embodiment of the present invention.
Figure 6B:
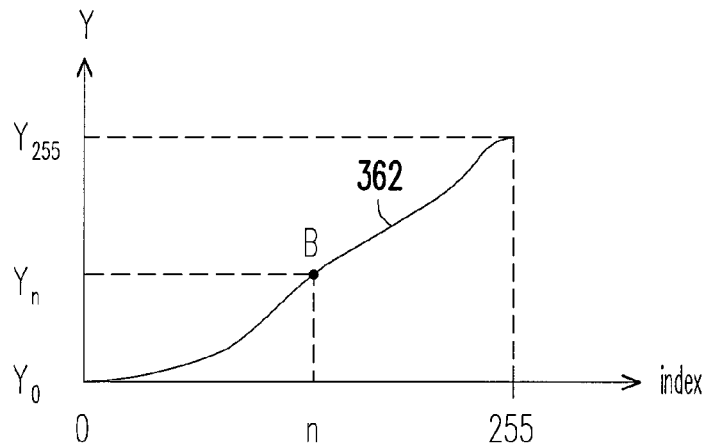
Figure 6C:
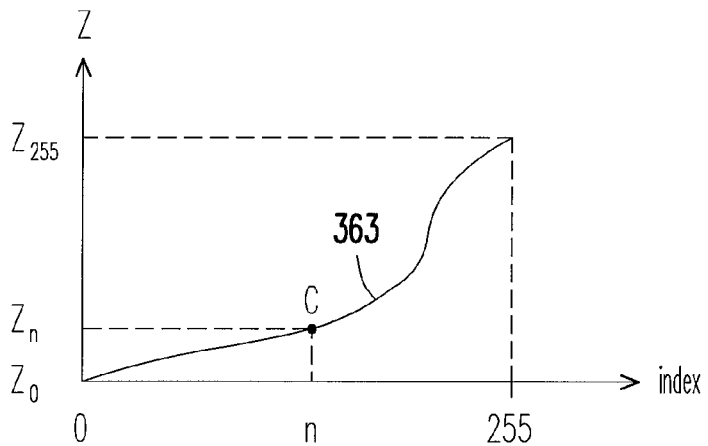

Please refer to FIGS. 6A-6C, and FIGS. 6A-6C are diagrams illustrating the three first native display curves 361-363 according to an embodiment of the present invention. The vertical axes of the three first native display curves 361-363 respectively represent the tristimulus values X, Y, and Z of the CIE 1931 XYZ color space, and the horizontal axes of the three first native display curves 361-363 represent an index corresponded to the gray level of one of the gray-image data sets TP1-TP255 or to the gray level of the black-image data set 334. For instance, after the measurement unit 282 measures the $n^{th}$ gray-level pattern GPn, the measurement unit 282 generates corresponding one (i.e. the $n^{th}$ one MDn) of the third measured data sets MD1-MD255, where the measured data set MDn may be represented as $$\begin{bmatrix} X_n \\ Y_n \\ Z_n \end{bmatrix}.$$

Accordingly, a node A of the native display curves 361, a node B of the native display curves 362, and node C of the native display curves 363 may be orientated based on the index of n and the measured data set $$\begin{bmatrix} X_n \\ Y_n \\ Z_n \end{bmatrix}.$$

In addition, the origins of FIGS. 6A-6C are determined based on the second measured data set $$\begin{bmatrix} X_0 \\ Y_0 \\ Z_0 \end{bmatrix},$$

such that the origins of FIGS. 6A-6C are $(0, X_0)$, $(0, Y_0)$, and $(0, Z_0)$ respectively.

Figure 7A:
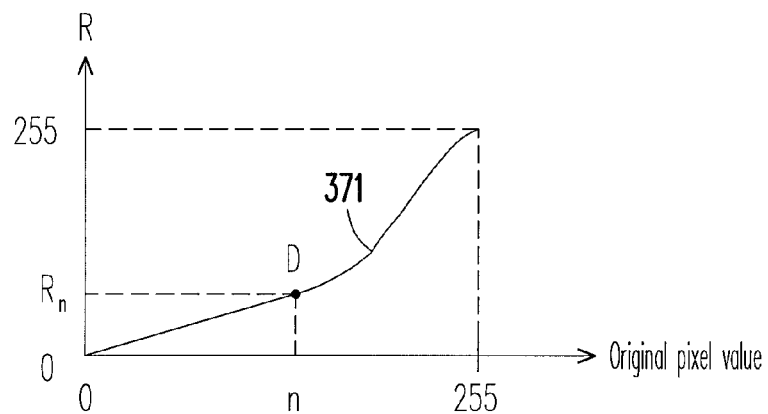
FIGS. 7A-7C are diagrams illustrating three second native display curves according to an embodiment of the present invention.
Figure 7B:
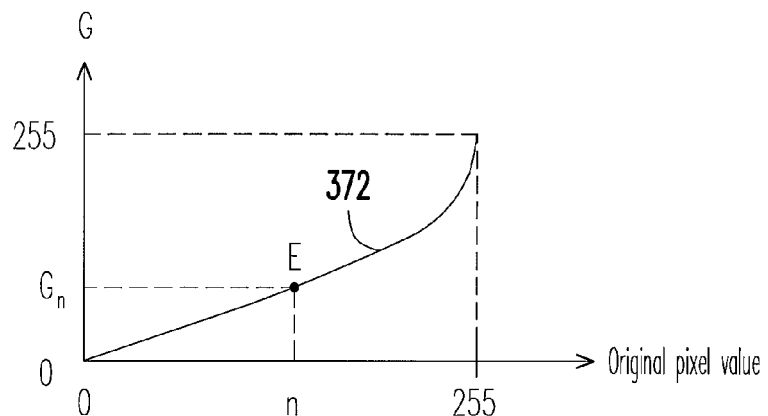
Figure 7C:
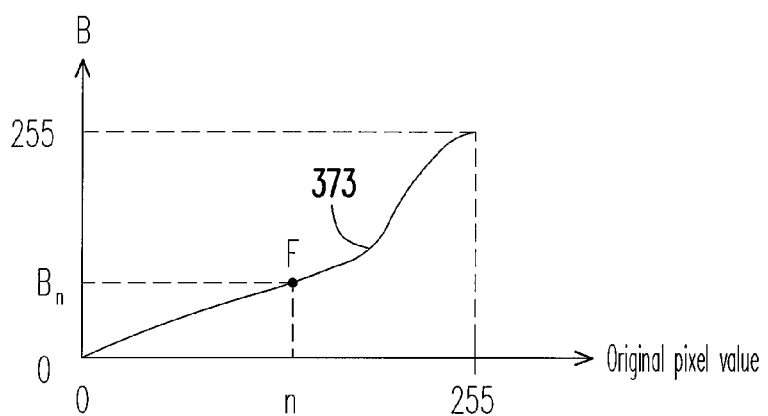

Please refer FIG. 3 again. In step S306, the processing unit 284 transforms the three first native display curves 361-363 into three second native display curves by using the transform model 288. Please refer to FIGS. 7A-7C, and FIGS. 7A-7C are diagrams illustrating the three second native display curves 371-373 according to an embodiment of the present invention. The vertical axes of the three second native display curves 371-373 respectively represent the visual pixel values R, G, and B of the RGB color space, and the horizontal axes of the second native display curves 371-373 represent the original pixel values R, G, and B of the RGB color space. For example, a node D of the native display curve 371, a node E of the native display curve 372, and a node F of the native display curve 373 are corresponding to an original pixel value of n, while the nodes D, E, and F correspond to the visual pixel values $R_n$, $G_n$, and $B_n$ respectively. By using the transform model 288, the measured data set $$\begin{bmatrix} X_n \\ Y_n \\ Z_n \end{bmatrix}$$

may be transformed into $$\begin{bmatrix} R_n \\ G_n \\ B_n \end{bmatrix}.$$

That is, $$\begin{bmatrix} R_n \\ G_n \\ B_n \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} X_n \\ Y_n \\ Z_n \end{bmatrix} + \begin{bmatrix} O_R \\ O_G \\ O_B \end{bmatrix}.$$

Accordingly, the processing unit 284 is capable of transforming the three first native display curves 361-363 into the three second native display curves 371-373 by using the transform model 288.

Figure 8A:
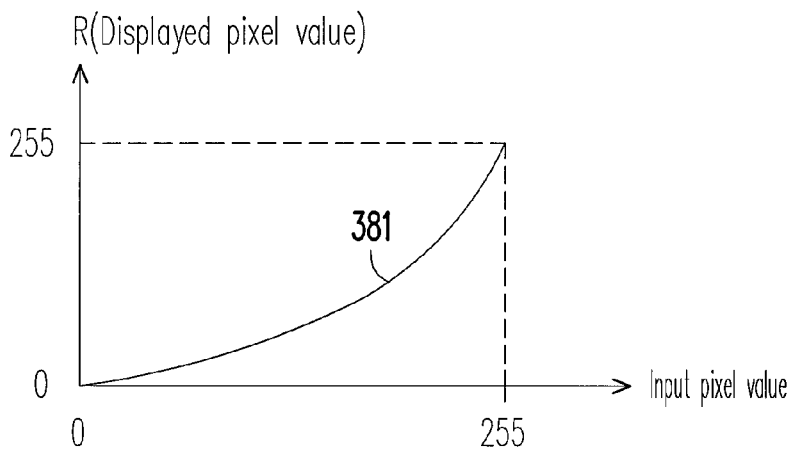
FIGS. 8A-8C are diagrams illustrating three final target curves according to an embodiment of the present invention.
Figure 8B:
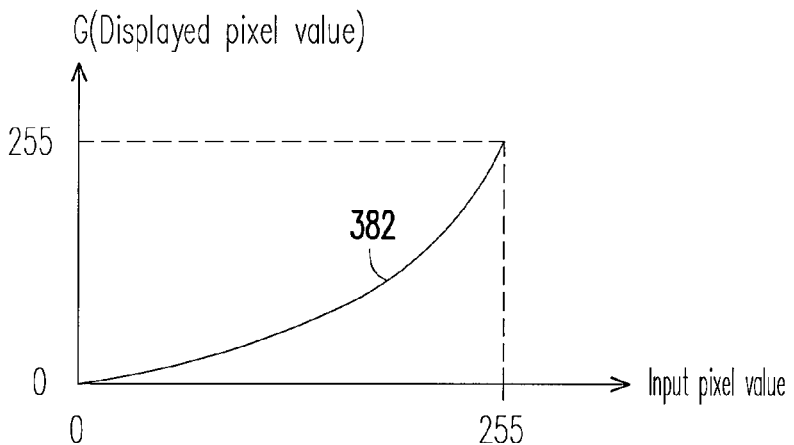
Figure 8C:
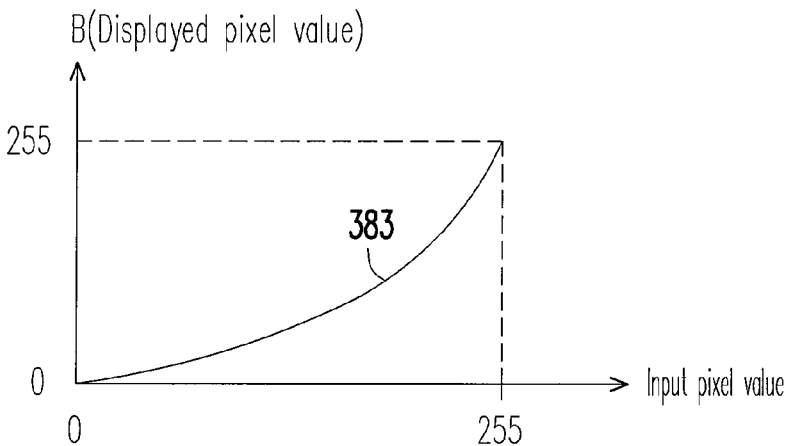

Please refer FIG. 3 again. In step S308, the processing unit 284 defines three final target curves. Referring FIGS. 8A-8C, the three final target curves 381-383 defined by the processing unit 284 are illustrated. After the color calibration of the display 270 is finished, the characteristics of the calibrated display 270 may be substantially represented by the three final target curves 381-383. The horizontal axes of FIGS. 8A-8C represent the input pixel value for red, green, and blue respectively. The vertical axes of FIGS. 8A-8C represent the displayed pixel value of the display 270 for red, green, and blue respectively.

Figure 9:
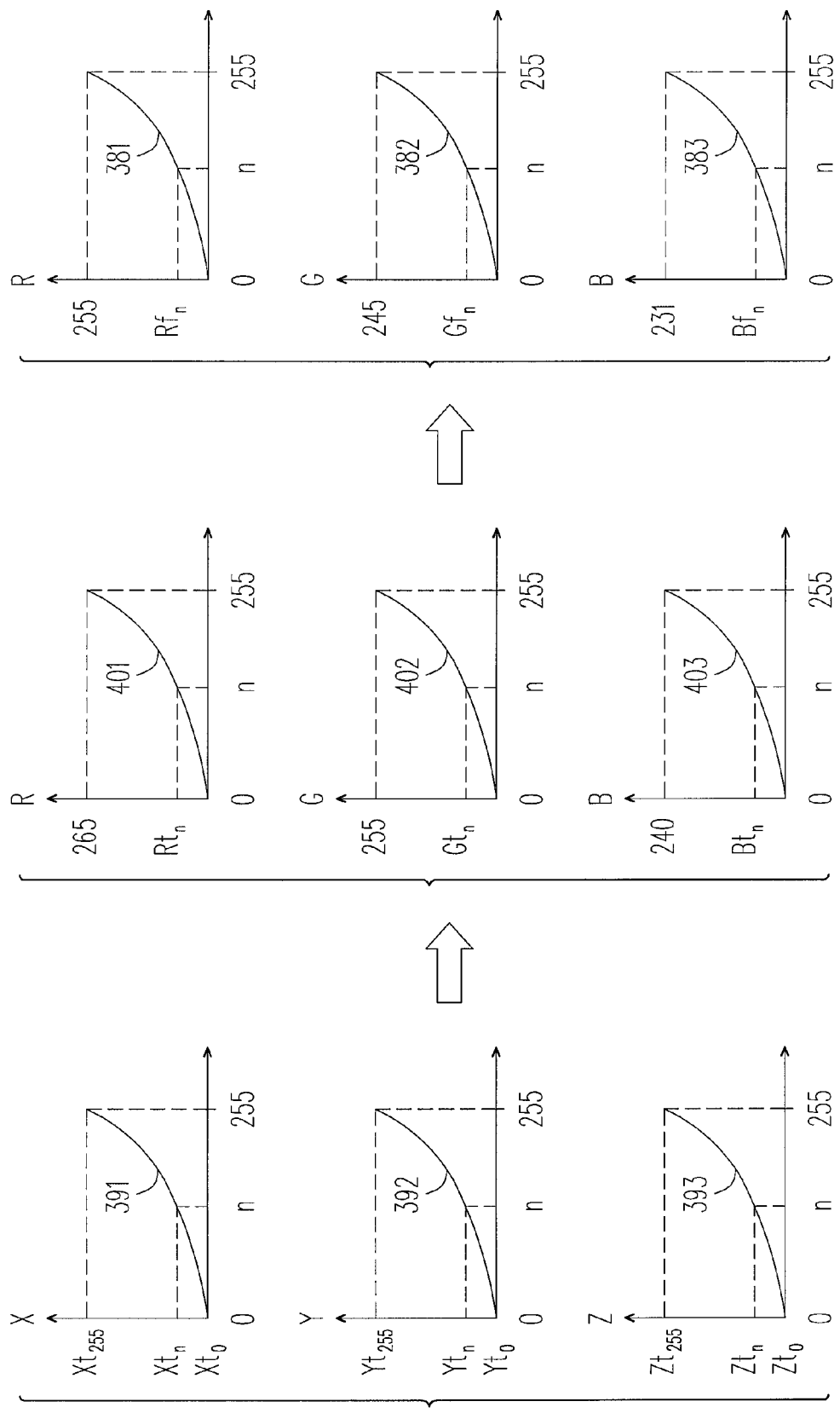
FIG. 9 is a diagram illustrating an exemplary embodiment of the present invention when a constant color temperature of 6500K and a gamma curve of 2.2 are desired.

In an embodiment of the present invention, when the processing unit 284 defines the three final target curves 381-383, the processing unit 284 firstly transforms three first target curves into three second target curves and then normalizes the three second target curves to obtain the three final target curves. Referring to FIG. 9, three first target curves 391-393 are transformed into three second target curves 401-403 by the processing unit 284, and the processing unit 284 normalizes the three second target curves 401-403 to obtain the three final target curves 381-383. The three first target curves 391-393 are curves showing the desired tristimulus values X, Y, and Z of the display 270 after finishing the color calibration of the display 270. In the present embodiment, the first target curve 392 is transformed from a gamma curve. For example, a gamma curve with a gamma value of 2.2 is defined by:

$$V_{Out} = (V_{In})^{2.2} \tag{7}$$

where $V_{IN}$ represents the input of the gamma curve, $V_{IN}$ represents the output of the gamma curve, $0 \le V_{In} \le 1$, and $0 \le V_{Out} \le 1$.

In the embodiment, the processing unit 284 defines the first target curve 392 by scaling the gamma curve by a maximum level of the first native display curve 362, wherein the first native display curve 362 corresponds to the first target curve 392, such that the first target curve 392 may be represented as follows:

$$Yt_n = \left(\frac{n}{255}\right)^{2.2} \times Yt_{255} \tag{8}$$

where, in the embodiment, $Yt_{255}$ is equal to the maximum of the tristimulus value Y of the native display curves 362 (i.e. $Yt_{255} = Y_{255}$);

n represents the value of the index; and $Yt_n$ represents a corresponding tristimulus value Y of the first target curve 392 when the index is equal to n.

After the processing unit 284 defines the first target curve 392, the other two first target curves 391 and 393 may be defined by the processing unit 284 according to the first target curve 392 and three chromaticity values x, y, and z of the CIE xyY color space. According to the specification of the CIE xyY color space, the three chromaticity values x, y, and z are respectively defined as:

$$x = \frac{X}{X + Y + Z} \tag{9}$$

$$y = \frac{Y}{X + Y + Z} \tag{10}$$

$$z = 1 - x - y \tag{11}$$

Therefore, the tristimulus values X and Z may be represented as follows:

$$X = Y \times \frac{x}{y} \tag{12}$$

$$Z = Y \times \frac{z}{y} \tag{13}$$

In the embodiment, a constant color temperature is desired, such that the three chromaticity values x, y, and z for the constant color temperature are fixed. Since the chromaticity values x, y, and z are fixed, the other two first target curves 391 and 393 may be respectively represented as follows:

$$Xt_n = Yt_n \times \frac{x}{y} = \left(\frac{n}{255}\right)^{2.2} \times Yt_{255} \times \frac{x}{y} \tag{14}$$

$$Zt_n = Yt_n \times \frac{z}{y} = \left(\frac{n}{255}\right)^{2.2} \times Yt_{255} \times \frac{z}{y} \tag{15}$$

After the processing unit 284 defines the three first target curves 391-393, the processing unit 284 uses the transform model 288 to transform the three first target curves 391-393 into three second target curves 401-403. Therefore, the pixel values $Rt_n$, $Gt_n$, and $Bt_n$ of the three second target curves 401-403 shown in FIG. 9 may be calculated as follows:

$$\begin{bmatrix} Rt_n \\ Gt_n \\ Bt_n \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} Xt_n \\ Yt_n \\ Zt_n \end{bmatrix} + \begin{bmatrix} O_R \\ O_G \\ O_B \end{bmatrix} \quad (16)$$

Noticeably, the maximum levels of the three second target curves 401-403 may be greater than 255 (i.e. a standard level for the RGB system). In such case, the three second target curves 401-403 may be scaled so as to match the standard level. Before the processing unit 284 scales the three second target curves 401-403, a scaling ratio is defined by the processing unit 284. In an embodiment, the scaling ratio is equal to a ratio of the standard level to a maximum of three maximum levels of the three second target curves 401-403. For example, in the embodiment, the three maximum levels of the three second target curves 401-403 are 265, 255, and 240, such that the maximum of three maximum levels of the three second target curves 401-403 is 265. Since the standard level is equal to 255 (i.e. $2^8-1$), the scaling ratio is 255/265. In detail, the three final target curves 381-383 may be respectively represented as follows:

$$Rf_n = Rt_n \times R_s = Rt_n \times \frac{255}{265} \quad (17)$$

$$Gf_n = Gt_n \times R_s = Gt_n \times \frac{255}{265} \quad (18)$$

$$Bf_n = Bt_n \times R_s = Bt_n \times \frac{255}{265} \quad (19)$$

where the parameter $R_s$ represents the scaling ratio.

Figure 10:
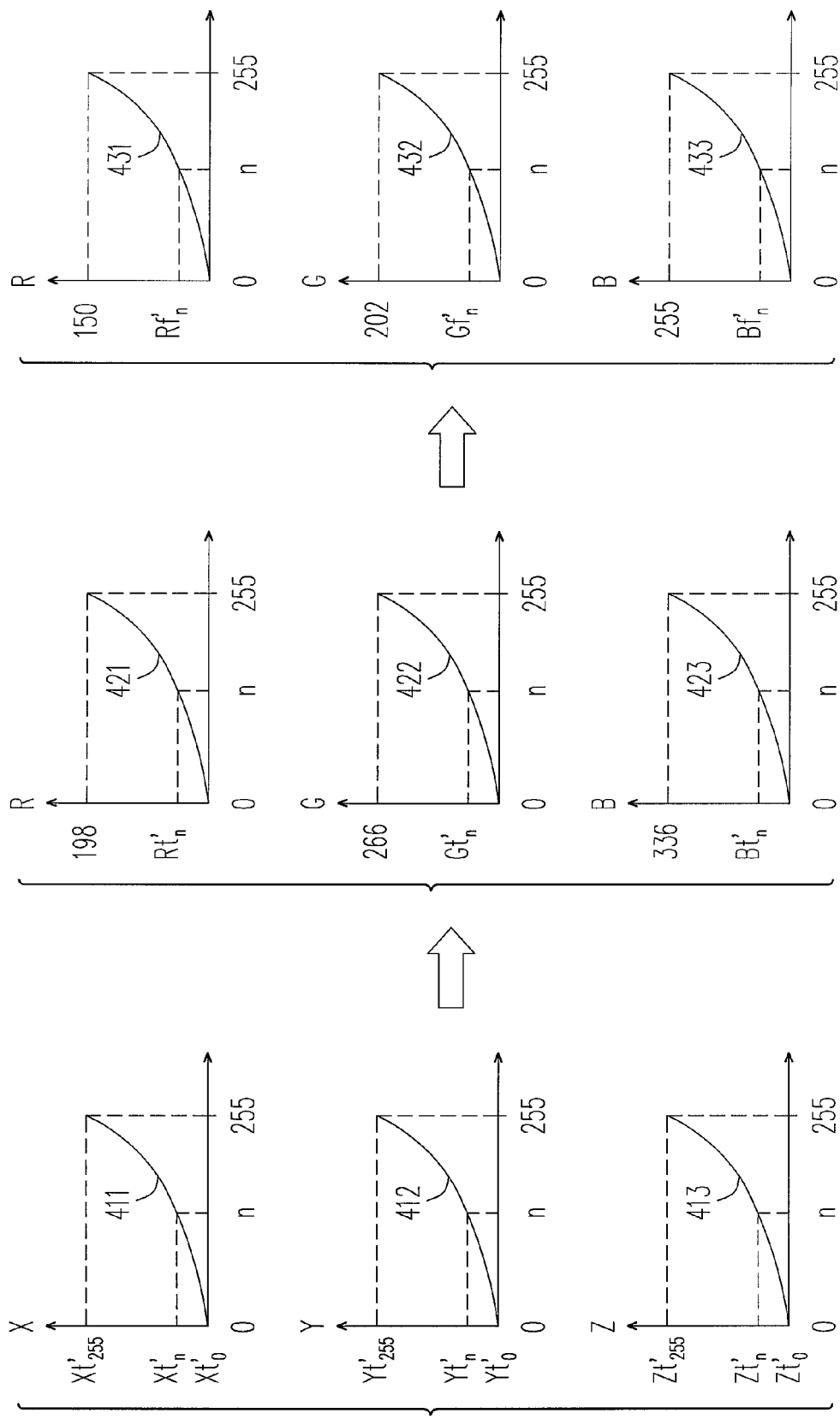
FIG. 10 shows how to establish the three final target curves according to another embodiment of the present invention.

FIG. 9 is a diagram illustrating an exemplary embodiment of the present invention when a constant color temperature of 6500K and a gamma curve of 2.2 are desired. In other embodiments of the present invention, the processing unit 284 may establish different three final target curves based on different requirements of color calibration of the display 270. For example, the display 270 may be a specific display satisfying with the specification of Digital Imaging and Communications in Medicine (DICOM). Referring to FIG. 10, three first target curves 411-413 of a DICOM display are illustrated. The processing unit 284 uses the transform model 288 to transform the three first target curves 411-413 into three second target curves 421-423, and then scales the three second target curves 421-423 by a scaling ratio. In the embodiment, the scaling ratio is equal to 255/336. The pixel values $Rt'_n$, $Gt'_n$, and $Bt'_n$ of the three second target curves 421-423 shown in FIG. 10 may be calculated as follows:

$$\begin{bmatrix} Rt'_n \\ Gt'_n \\ Bt'_n \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} Xt'_n \\ Yt'_n \\ Zt'_n \end{bmatrix} + \begin{bmatrix} O_R \\ O_G \\ O_B \end{bmatrix} \quad (20)$$

Moreover, the three final target curves 431-433 may be respectively represented as follows:

$$Rf'_n = Rt'_n \times R'_s = Rt'_n \times \frac{255}{336} \quad (21)$$

$$Gf'_n = Gt'_n \times R'_s = Gt'_n \times \frac{255}{336} \quad (22)$$

$$Bf'_n = Bt'_n \times R'_s = Bt'_n \times \frac{255}{336} \quad (23)$$

where the parameter $R'_s$ represents the scaling ratio of the present embodiment.

Please refer to FIGS. 2 and 3 again. After the three final target curves are established, the processing unit 284 establishes three look-up tables 291-293 according to the three final target curves and the three second native display curves in step S310. Take the embodiment shown in FIGS. 7A-7C and FIG. 9 for example, the processing unit 284 establishes the three look-up tables 291-293 according to the three final target curves 381-383 and the three second native display curves 371-373. In detail, the processing unit 284 establishes the first look-up table 291 according to the final target curves 381 and the second native display curves 371, the processing unit 284 establishes the second look-up table 292 according to the final target curves 382 and the second native display curves 372, and the processing unit 284 establishes the third look-up table 293 according to the final target curves 383 and the second native display curves 373. The three look-up tables 291-293 are used for color calibration of the display 270 for red, green, and blue respectively. FIG. 11 shows how to establish one of the three look-up tables 291-293 according to an embodiment of the present invention. As shown in FIG. 11, one of the three final target curves 381-383 is illustrated on the right, one of the three second native display curves 371-373 is illustrated on the middle, and the corresponding look-up table established by the processing unit 284 is illustrated on the left. FIG. 11 shows the mapping relationships between the input pixel values and the displayed pixel values of the final target curve. The look-up table, the second native display curve, and the final target curve correspond to the same color (i.e. red, green, or blue). According to the final target curve shown in FIG. 11, when an input pixel value is 130, the corresponding displayed pixel value may be 102. Moreover, as shown in FIG. 11, a calibrated pixel value of the second native display curve corresponding to the displayed pixel value of 102 is 128, such that a relationship, of the look-up table, between the input pixel value of 130 and the calibrated pixel value of 128 may be established by the processing unit 284. Similarly, more relationships between the input pixel value and the calibrated pixel value may be established in the look-up table. After the relationships between the input pixel values and the calibrated pixel values are established in the three look-up tables, the processing unit 284 may convert a received input image data set to a calibrated image data set according to the three look-up tables.

Figure 12:
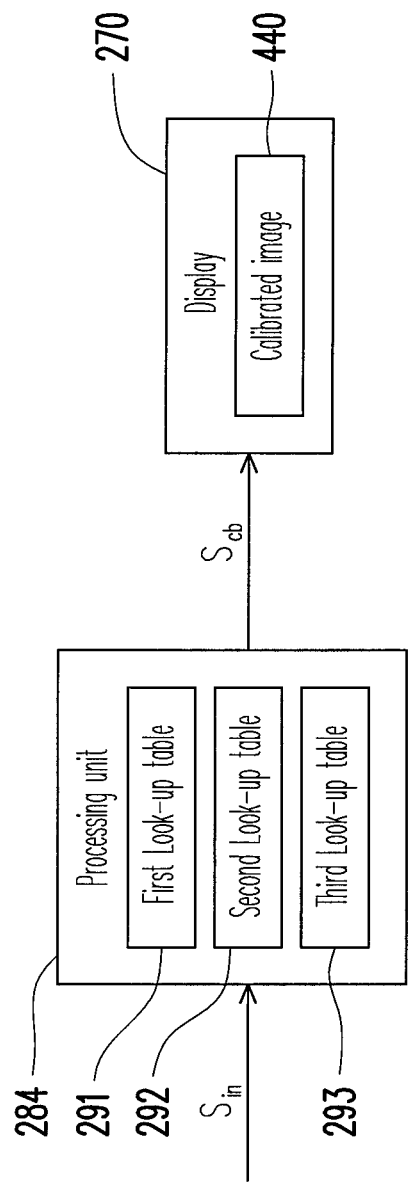
FIG. 12 is a block diagram showing how the processing unit uses the three look-up tables for color calibration of the display.

Please refer to FIGS. 3 and 12. In step S312, when the processing unit 284 receives an input image data set $S_{in}$, the processing unit 284 converts the input image data set $S_{in}$ to a calibrated image data set $S_{cb}$ according to the three look-up tables 291-293. The calibrated image data set $S_{cb}$ may be transmitted to the display 270, such that the display 270 displays a calibrated image 440 according to the calibrated image data set $S_{cb}$.

Figure 13:
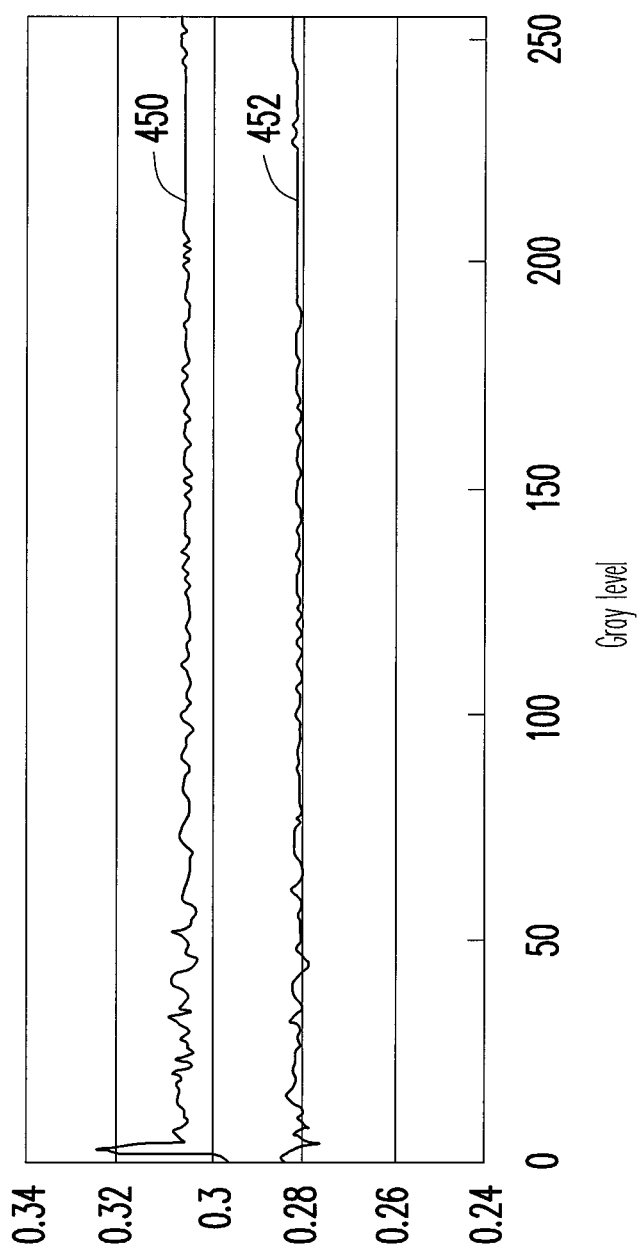
FIG. 13 is an experimental diagram showing the relationships between the gray level and two chromaticity values x and y of the display according to an embodiment of the present invention.

Please refer to FIG. 13, and FIG. 13 is an experimental diagram showing the relationships between the gray level and two chromaticity values x and y of the display 270 according to an embodiment of the present invention. The vertical axis represents the two chromaticity values x and y, and the horizontal axis represents the gray level. In addition, the curve 450 responds to the chromaticity value y, and the curve 452 responds to the chromaticity value x. The two chromaticity values x and y are substantially constant, such that the display 270 substantially has a constant color temperature for every gray-level.

Figure 14:
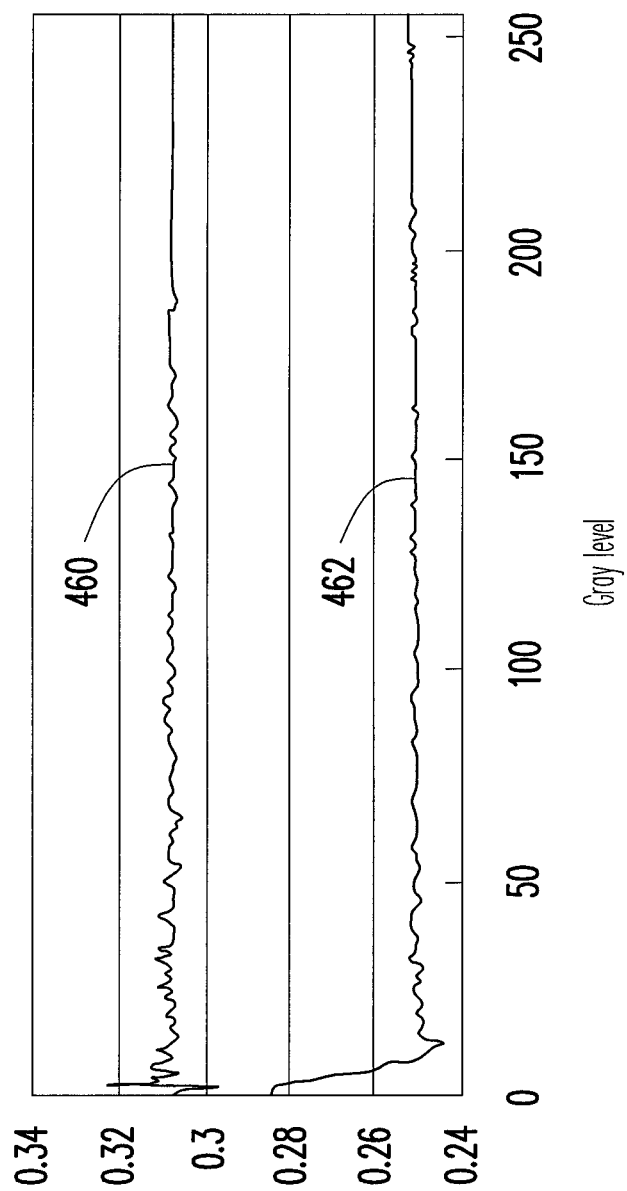
FIG. 14 is another experimental diagram showing the relationships between the gray level and two chromaticity values x and y of the display according to an embodiment of the present invention.

Please refer to FIG. 14, and FIG. 14 is another experimental diagram showing the relationships between the gray level and two chromaticity values x and y of the display 270 according to an embodiment of the present invention. The vertical axis represents the two chromaticity values x and y, and the horizontal axis represents the gray level. In addition, the curve 460 responds to the chromaticity value y, and the curve 462 responds to the chromaticity value x. The two chromaticity values x and y are substantially constant, such that the color temperature of the display 270 is substantially constant for every gray-level.

Please refer to FIG. 2 again. In an embodiment of the present embodiment, the display 270 is a liquid crystal display (LCD) and has a light source 272. The light source 272 is a backlight module, and the backlight module provides light when the display 270 is turned on. According the equations (17)-(19) or (21)-(23), after the three second target curves 401-403 or 421-423 are scaled (i.e. normalized) by the processing unit 284, the pixel values ($Rf_n$, $Gf_n$, $Bf_n$) or ($Rf'_n$, $Gf'_n$, $Bf'_n$) are decreased as compared with the pixel values ($Rt_n$, $Gt_n$, $Bt_n$) or ($Rt'_n$, $Gt'_n$, $Bt'_n$). Therefore, the images displayed on the display 270 may be darker than the images that a user desires to see. In order to compensate the illumination difference between the displayed images and the desired images, the processing unit 284 transmits a control signal Sc to the backlight module 272 so as to increase the power of the backlight module 272. Accordingly, the images displayed on the display 270 may become brighter and may be satisfied by the user.

In an embodiment of the present invention, the processing unit 284 generates the control signal Sc according to the three maximum levels of the three final target curves. Referring to FIG. 9, the three maximum levels of the three final target curves 381-383 are 255, 245, and 231. According to the equation (1), the relationships between the three maximum levels of the three final target curves 381-383 and three corresponding tristimulus values ($X_m$, $Y_m$, $Z_m$) may be represented as follows:

$$\begin{bmatrix} 255 \\ 245 \\ 231 \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} X_m \\ Y_m \\ Z_m \end{bmatrix} + \begin{bmatrix} O_R \\ O_G \\ O_B \end{bmatrix} \quad (24)$$

In the embodiment, the three maximum levels of the three final target curves 381-383 are 255, 245, and 231, the corresponding values ($X_m$, $Y_m$, $Z_m$) of the three tristimulus values X, Y, and Z are 146, 161, and 85. Then, the processing unit 284 obtains a compensation ratio of $$\frac{Yt_{255}}{161} \left( \text{i.e. } \frac{Yt_{255}}{Y_m} \right).$$

In detail, the compensation ratio is associated with the tristimulus value $Y_m$. The processing unit 284 generates the control signal Sc according to the compensation ratio of $$\frac{Yt_{255}}{Y_m},$$

such that the images displayed on the display 270 become brighter due to the increase of the power of the backlight module 272. Finally, after the power of the backlight module 272 is increased, the tristimulus value Y of the display 270 is equal to $Y_{255}$, such that the display 270 displays images with enough illumination, and the user may see the desired images.

Similarly, three tristimulus values ($X'_m$, $Y'_m$, $Z'_m$) corresponded to the three maximum levels of the three final target curves 431-433 shown in FIG. 10, may be calculated according to the equation (1). That is:

$$\begin{bmatrix} 150 \\ 202 \\ 255 \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} X'_m \\ Y'_m \\ Z'_m \end{bmatrix} + \begin{bmatrix} O_R \\ O_G \\ O_B \end{bmatrix} \quad (24)$$

In this case, the tristimulus value $Y'_m$ is equal to 135.97, such that the related compensation ratio is equal to $$\frac{Yt'_{255}}{135.97} \left( \text{i.e. } \frac{Yt'_{255}}{Y'_m} \right).$$

Therefore, the illumination difference between the displayed images and the desired images of the display may be compensated according to the compensation ratio $$\frac{Yt'_{255}}{Y'_m}.$$

In overview, in the embodiments of the invention, a transform model is established for color transformation between a first color space and a second color space. Three first native display curves are established according to measured data sets, wherein the measured data sets are generated by a measurement unit when the display displays three primary-color patterns, a black pattern, and a plurality of gray-level patterns. Therefore, a total number of the test patterns for establishing the three first native display curves of the display is reduced. The three first native display curves then are converted into three second native display curves according to the transform model. Therefore, the native color characteristics of the display in the second color space may be established by the three second native display curves. Then, three look-up tables for color calibration of the display are established according to three final target curves and the three second native display curves. The display is calibrated according to the three look-up tables such that the color temperature of the display may be substantially constant for every gray-level. Moreover, the power of a light source (e.g. a backlight module) of the display may be adjusted according to a compensation ratio, such that the illumination difference between the displayed images and the desired images may be compensated.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of calibrating a liquid crystal display, the method comprising steps of:
   measuring the display to generate three first measured data sets by utilizing a measurement unit while the display is capable of displaying three primary-color patterns according to three primary-color-image data sets;
   measuring the display to generate a second measured data set by utilizing the measurement unit while the display is capable of displaying a black pattern according to a black-image data set;
   establishing a transform model according to the three first measured data sets, the second measured data set, the three primary-color-image data sets, and the black-image data set by utilizing a processing unit;
   measuring the display to generate a plurality of third measured data sets by utilizing the measurement unit while the display is capable of displaying a plurality of gray-level patterns according to a plurality of gray-image data sets;
   establishing three first native display curves according to the second measured data set and the third measured data sets by utilizing the processing unit, wherein the vertical axes of the three first native display curves respectively represent tristimulus values, and the horizontal axes of the three first native display curves represent a gray level index;
   transforming the three first native display curves into three second native display curves by utilizing the transform model;
   defining three final target curves by utilizing the processing unit, comprising:
      normalizing three second target curves to obtain the three final target curves by utilizing the processing unit;
      transforming three first target curves into the three second target curves by utilizing the transform model;
   establishing three look-up tables according to the three final target curves and the three second native display curves by utilizing the processing unit;
   providing an input image data set to the processing unit;
   converting the input image data set to a calibrated image data set according to the three look-up tables;
   displaying a calibrated image on the display according to the calibrated image data set;
   calculating a compensation ratio according to the transform in model and three maximum levels of the three final target curves, wherein a maximum of one of the three first native display curves divided by a corresponding tristimulus value is the compensation ratio, and the corresponding tristimulus value is calculated by using the transfoun model and the three maximum levels of the three final target curves; and
   increasing a power of a light source of the display according to the compensation ratio.

2. The method as claimed in claim 1, wherein the three primary-color-image data sets are a red-image data set, a green-image data set, and a blue-image data set, and the three primary-color patterns are a red pattern, a green pattern, and a blue pattern, wherein the display is capable of displaying the red pattern according to the red-image data set, the display is capable of displaying the green pattern according to the green-image data set, and the display is capable of displaying the blue pattern according to the blue-image data set.

3. The method as claimed in claim 1, wherein each of the gray-image data sets has a first color subset, a second color subset, and a third color subset, and three pixel values of the first color subset, the second color subset, and the third color subset are identical.

4. The method as claimed in claim 1, wherein the processing unit is capable of normalizing the three second target curves by scaling the three second target curves by a ratio of a standard level to a maximum of three maximum levels of the three second target curves.

5. The method as claimed in claim 1, wherein the processing unit is capable of defining two of the three first target curves according to the other one of the three first target curves and three chromaticity values x, y, and z of the CIE xyY color space.

6. The method as claimed in claim 5, wherein the processing unit is capable of defining the other one of the three first target curves by scaling a gamma curve by a maximum level of a corresponding one of the three first native display curves.

7. The method as claimed in claim 6, wherein the other one of the three first native display curves is a curve of tristimulus value Y of the CIE 1931 XYZ color space.

8. A calibration system for calibrating a liquid crystal display, the calibration system comprising:
   a measurement unit, configured to measure the display so as to generate measured data sets while the display is capable of displaying patterns according to image data sets; and
   a processing unit, coupled to the measurement unit and configured to establish a transforms model and three look-up tables;
   wherein the processing unit is capable of establishing the transform model according to three first measured data sets, a second measured data set, three primary-color-image data sets, and a black-image data set, the measurement unit is capable of generating the three first measured data sets by measuring the display while the display is capable of displaying three primary-color patterns according to the three primary-color-image data sets, and the measurement unit is capable of generating the second measured data set by measuring the display while the display is capable of displaying a black pattern according to the black-image data set;

wherein the processing unit is capable of using the transform model to transform three first native display curves into three second native display curves, the processing unit is capable of establishing the three first native display curves according to the second measured data set and a plurality of third measured data sets, the vertical axes of the three first native display curves respectively representing tristimulus values, the horizontal axes of the three first native display curves representing a gray level index, and the measurement unit is capable of generating the third measured data sets by measuring the display while the display is capable of displaying a plurality of gray-level patterns according to a plurality of gray-image data sets;

wherein the processing unit is capable of defining three final target curves, and the processing unit is capable of establishing the three look-up tables according to the three final target curves and the three second native display curves;

wherein the processing unit is capable of obtaining the three final target curves by normalizing three second target curves, and the processing unit is capable of using the transform model to transform three first target curves into the three second target curves;

wherein the processing unit is capable of converting an input image data set to a calibrated image data set according to the three look-up tables, and the processing unit is capable of outputting the calibrated image data set to the display, such that the display is capable of displaying a calibrated image according to the calibrated image data set; and wherein the processing unit is capable of calculating a compensation ratio according to the transform model and three maximum levels of the three final target curves, wherein a maximum of one of the three first native display curves divided by a corresponding tristimulus value is the compensation ratio, and the corresponding tristimulus value is calculated by using the transfolin model and the three maximum levels of the three final target curves; and wherein the processing unit is capable of increasing a power of a light source of the display according the compensation ratio.

9. The calibration system as claimed in claim 8, wherein the processing unit has a signal generator coupled to the display and configured to output image data sets to the display.

10. The calibration system as claimed in claim 8, wherein the three primary-color-image data sets are a red-image data set, a green-image data set, and a blue-image data set, and the three primary-color patterns are a red pattern, a green pattern, and a blue pattern, wherein the display is capable of displaying the red pattern according to the red-image data set, the display is capable of displaying the green pattern according to the green-image data set, and the display is capable of displaying the blue pattern according to the blue-image data set.

11. The calibration system as claimed in claim 8, wherein each of the gray-image data sets has a first color subset, a second color subset, and a third color subset, and three pixel values of the first color subset, the second color subset, and the third color subset are identical.

12. The calibration system as claimed in claim 8, wherein the processing unit is capable of normalizing the three second target curves by scaling the three second target curves by a ratio of a standard level to a maximum of three maximum levels of the three second target curves.

13. The calibration system as claimed in claim 8, wherein the processing unit is capable of defining two of the three first target curves according to the other one of the three first target curves and three chromaticity values x, y, and z of the CIE xyY color space.

14. The calibration system as claimed in claim 13, wherein the processing unit is capable of defining the other one of the three first target curves by scaling a gamma curve by a maximum level of a corresponding one of the three first native display curves.

15. The calibration system as claimed in claim 14, wherein the other one of the three first native display curves is a curve of tristimulus value Y of the CIE 1931 XYZ color space.

* * * * *